3,314,065
VEHICLE SENSING AND VELOCITY MEASURING APPARATUS FOR USE IN TRAFFIC CONTROL SYSTEM
Oliver I. Steigerwalt and Harry F. Strenglein, Clearwater, Fla., assignors to Sperry Rand Corporation, Great Neck, N.Y., a corporation of Delaware
Filed Apr. 26, 1965, Ser. No. 450,662
10 Claims. (Cl. 343—8)

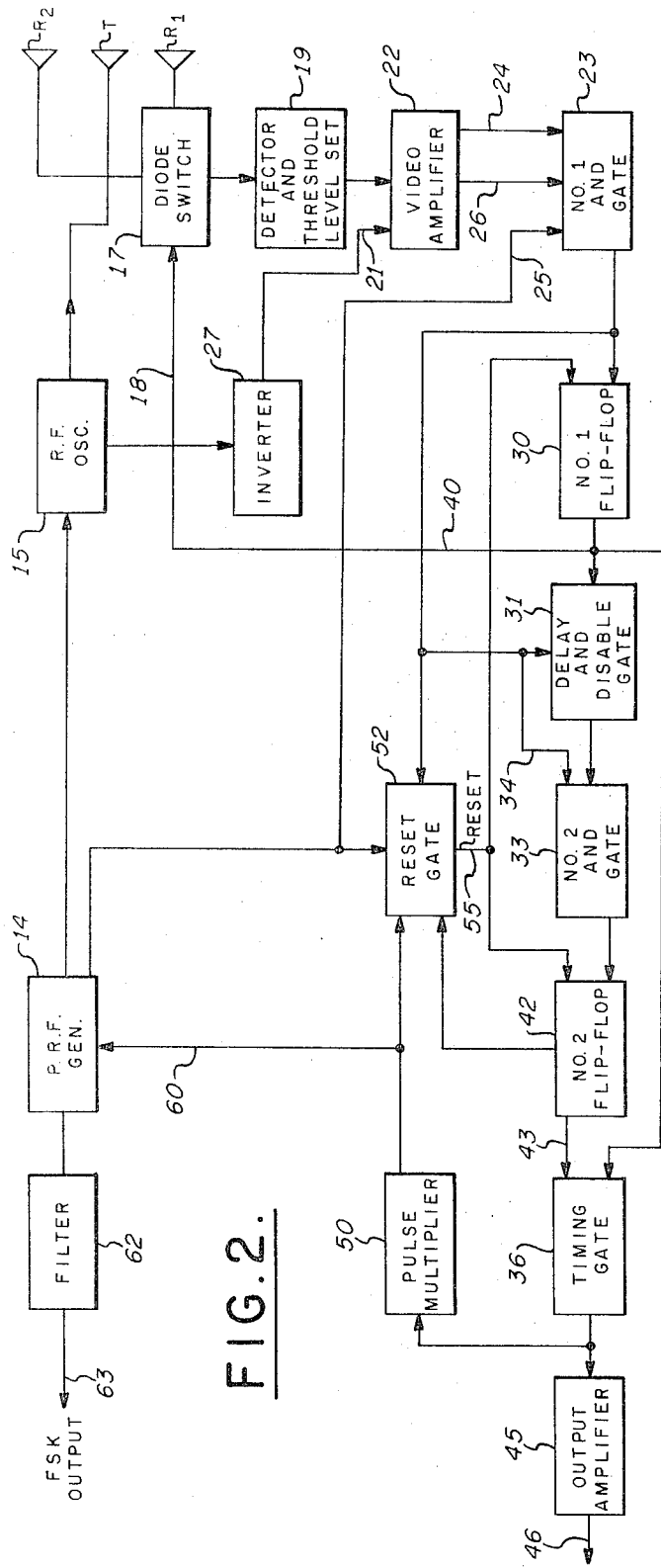
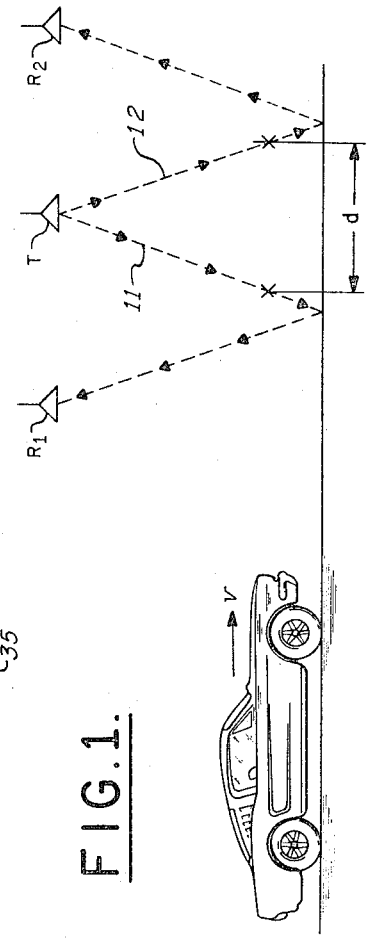
FIG. 1.
FIG. 2.
INVENTORS
OLIVER I. STEIGERWALT
HARRY F. STRENGLEIN
BY
John H. Gallagher
ATTORNEY

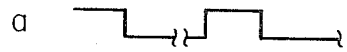
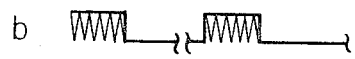
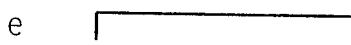
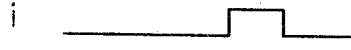
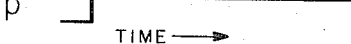
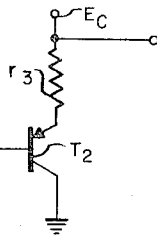
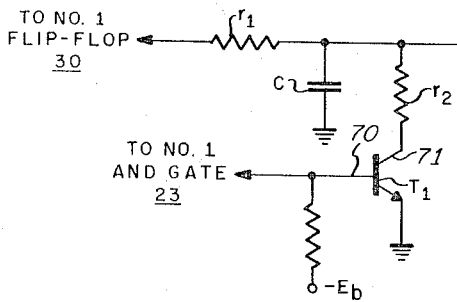

This invention relates to an object detector and more particularly with means for sensing the presence of motor vehicles and determining the velocities of the vehicles.

The control of vehicular traffic has become a matter of major concern in many metropolitan areas and has stimulated considerable effort toward the development of computer-centered electronic systems that will determine and analyze current traffic conditions and in response thereto will operate the traffic controlling means, such as traffic lights and route directors, so as to make optimum use of existing streets and highways and thereby avoid congestions and obviate the considerable expense of constructing new highways.

The success of the computer-centered traffic control systems is dependent upon the accuracy of the information that is fed to the computer, and it therefore is necessary to have means for accurately monitoring the current traffic conditions to obtain relevant information as to the volume and speed of traffic along a roadway, and accordingly, this is a primary object of the present invention.

It is a further object of this invention to provide electronic apparatus for determining the time that is required for a vehicle to traverse a known distance along a roadway, the apparatus being characterized by including features that will permit malfunctions in its operation to be detected.

In accordance with the present invention a measured distance, considerably shorter than the shortest vehicle that is expected to use the traffic system, is laid out along the direction of travel in one or more lanes of traffic and means are provided for producing a first distance signal when a vehicle first enters the measured distance. The first distance signal changes the stable state of a first bistable element which in turn starts a timing pulse whose duration will provide an indication of the vehicle's velocity. The change of state of the first bistable element also disables the means that produced the first distance signal and enables means that is capable of producing a second distance signal when the vehicle reaches the end of the measured distance. The change of state of the first bistable element is delayed in time and then applied to an AND gate just after the termination of the first distance signal, the lack of coincidence preventing any signal from passing the AND gate. When the vehicle reaches the end of the measured distance the second distance signal is produced and is coupled to the above-mentioned AND gate through which it now may pass since the signal representing the second stable state of the first bistable element now is present at the AND gate. The signal passed by the AND gate transfers a second bistable element to its second stable state and the signal representing this second stable state terminates the timing pulse. The duration of the timing pulse represents the time interval required for the vehicle to travel the known distance, and consequently the duration of this pulse may be expressed directly in terms of velocity. Additional means are provided for multiplying or stretching the duration of the timing pulse to some longer duration which is a multiple $m$ of the original timing pulse duration. This multiplied pulse duration is selected so that it will terminate before a second vehicle can reach the beginning of the measured distance, this second vehicle traveling a fixed distance behind a vehicle of shortest anticipated length. The multiplied duration pulse, the output of the second bistable element, and the first and second distance signals are coupled to a reset gate which functions to reset the two bistable elements and the distance signal producing means only after the multiplied duration pulse has terminated, both distance signals have been received (which will be indicated by the second bistable element being in its second stable state), and after the vehicle has passed beyond the end of the measured distance. By preventing the resetting of the system until all of the above-named conditions have occurred the possibilities are greatly reduced that the system might erroneously terminate a timing pulse and begin a new spurious one before the vehicle has traveled through the entire measured distance.

The invention will be described in connection with the accompanying drawings wherein:

FIG. 1 is an illustration of the arrangement by which the speed of a vehicle is measured in accordance with the present invention;

FIG. 2 is a simplified block diagram of an electronic system that obtains a measurement of the time interval $\Delta t$ that it takes the automobile of FIG. 1 to travel the known distance $d$;

FIG. 3 is a series of waveforms that is used in describing the operation of the system illustrated in FIG. 2; and FIG. 4 is a simplified schematic diagram of the delay and disable gate circuit 33 of FIG. 2.

Referring now in detail to the drawings, the arrangement for obtaining a signal to determine the presence and the velocity of a moving vehicle is depicted in the simplified illustration of FIG. 1 wherein the automobile is moving with the velocity $v$ along a prescribed traffic lane. Disposed vertically above the traffic lane is a directive transmitting antenna T and the two receiving antennas $R_1$ and $R_2$, all of which are aligned in the direction of travel of the traffic. Transmitting antenna T is centered between the two receiving antennas $R_1$ and $R_2$ and the spacing between the two receiving antennas is accurately known. In practice, the receiving antennas were separated by a distance of two feet. Transmitting antenna T is continuously radiating pulses of electromagnetic waves in the directive patterns 11 and 12 which cause the respective waves to impinge on the surface of the traffic lane on which the automobile is traveling, and then to be reflected into the respective receiving antennas $R_1$ and $R_2$. As the automobile travels to the right its front edge first will intercept the upstream beam 11, and because the automobile has a higher reflectivity than the roadway, an increased amount of energy will be reflected back to receiving antenna $R_1$. After the automobile has traveled the known distance $d$ in the unknown time interval $\Delta t$, its front edge will intercept the downstream beam 12 and will cause an increased amount of energy to be reflected back to receiving antenna $R_2$. The velocity $v$ of the vehicle may be determined by obtaining a measurement of the time interval between the reflections of increased amplitude as received by the receiving antennas $R_1$ and $R_2$, it being remembered that the distance $d$ is known.

The means for accurately and reliably obtaining this time, or velocity, measurement will be described with the aid of FIGS. 2 and 3 wherein the P.R.F. generator 14 produces a series of short pulses, FIG. 3a, at a repetition frequency of 1,000 pulses per second, for example. These pulses modulate the R.F. oscillator 15 which in turn produces the pulses of radio frequency waves, FIG. 3b, which may have a carrier frequency of 2,500 megacycles per second, for example. These R.F. pulses are coupled to transmitting antenna T which radiates them downwardly onto a traffic lane whose traffic is to be monitored, as illustrated in FIG. 1.

The receiving antennas $R_1$ and $R_2$ are coupled through a switch 17, which may be a known type of diode switching network that functions in response to control signals on line 18 to selectively couple one or the other of the receiving antennas to the detector and threshold level set network 19. It will be assumed that diode switch 17 first is set to connect the upstream antenna $R_1$ to the detector in network 19.

The detector and threshold level set network functions to detect the R.F. signals received by upstream antenna $R_1$ and passes only detected pulses that exceed a threshold level, this level being selected to pass only the higher amplitude pulses that are reflected from vehicles but not the lower amplitude pulses that are reflected from the surface of the roadway.

Assuming now that an automobile has intercepted the upstream antenna beam 11, FIG. 1, and the first R.F. pulse of increased amplitude resulting therefrom has passed detector and threshold level set network 19, this first pulse, FIG. 3c, is coupled over line 24 and forms one input to No. 1 AND gate 23. AND gate 23 serves solely a circuit self-testing function which now will be described. A second input to AND gate 23 is a signal on line 25 from P.R.F. generator 14, and the third input is a signal on line 26 which is an R.F. oscillator signal which is inverted in inverter 27 and amplified in video amplifier 22. When the system is functioning properly, but in the absence of a received signal, the R.F. oscillator signal on line 26 acts as an inhibiting signal that prevents any signal from passing No. 1 AND gate 23. This R.F. oscillator signal on line 26 is out of phase with a received signal that will appear on line 24 and when a received signal is present on line 24 it will have an effect of overriding the inhibit signal on line 26 and will permit AND gate 23 to pass a signal. Should the R.F. oscillator signal on line 26 be absent due to a failure of R.F. oscillator 15 or video amplifier 22, AND gate 23 will have no inhibit signal and the P.R.F. signal on line 26 will pass directly through AND gate 23.

When a received pulse is present on line 24 and a pulse is passed through AND gate 23, FIG. 3d, it triggers No. 1 flip-flop 30 to set it in the second one of its two stable states, FIG. 3e. The leading edge of waveform, FIG. 3e, will be delayed in delay and disable gate 31 to produce the waveform of FIG. 3f. The disable gate function of block 31 is used in the self-test operation of the system and will be explained later.

The output of delay block 31, FIG. 3f, is coupled to No. 2 AND gate 33 whose other input on line 34 is the output from No. 1 AND gate 23. Because of the delay at the leading edge of the waveform of FIG. 3f, the pulse of FIG. 3d will have ended before waveform of FIG. 3f has time to build up so that No. 2 AND gate 33 will not pass the pulse of FIG. 3d from No. 1 AND gate 23.

The output of No. 1 flip-flop 30 also is coupled over line 35 to timing gate 36 which may be a two-input bistable circuit, or other suitable circuit that is enabled by the input signal on line 35. Because flip-flop 30 changed states in response to the first received pulse passed by No. 1 AND gate 23, the leading edge of the pulse at the output of timing gate 36, FIG. 3g, is an indication of the instant of time that the automobile of FIG. 1 first intercepted the upstream antenna beam 11 from transmitting antenna T. This is the beginning of the time interval $\Delta t$ during which the automobile traverses the known distance $d$.

The output of No. 1 flip-flop 30 also is coupled over line 40 to diode switch 17 which functions in response to the change of states of flip-flop 30, to switch the detector 19 to receiving antenna $R_2$ rather than $R_1$, it being understood that this occurs at the instant of time that the automobile first intercepts the upstream beam 11, FIG. 1. When receiving antenna $R_2$ first is switched into the system the automobile of FIG. 1 has not as yet reached the downstream transmitting beam 12, so that there will be no received signals from antenna $R_2$ of sufficient magnitude to pass the detector and threshold level set network 19.

Throughout the time interval that it takes the automobile to travel the distance $d$ from the upstream beam 11 to the downstream beam 12 the timing waveform of FIG. 3g remains at its higher level because No. 1 flip-flop 30 still is in its second stable state and maintains an input signal on line 35.

After the automobile has traveled the distance $d$, which might be two feet, as an example, it intercepts the downstream beam 12 and causes a signal of increased amplitude to be reflected to receiving antenna $R_2$. This signal of increased amplitude is passed by detector and threshold level set network 19, FIG. 3h, and produces an output signal from No. 1 AND gate 23, FIG. 3i. The output of AND gate 23 will have no effect on No. 1 flip-flop 30 because it already is in its second stable state. The output signal, FIG. 3i, of AND gate 23 will, however, actuate No. 2 AND gate 33 via line 34 since both input signals, FIGS. 3f and 3i, are present simultaneously. The output of No. 2 AND gate 33, FIG. 3j, will trigger No. 2 flip-flop circuit 42 which then transfers to its second stable state, FIG. 3k. The change in state of No. 2 flip-flop 42, FIG. 3k, is coupled to timing gate 36 on line 43 and resets the timing gate 36, thereby terminating the timing pulse of FIG. 3g. The timing pulse is coupled through output amplifier 45 to output terminal 46. The duration of the timing signal, FIG. 3g, is an indication of the time interval $\Delta t$ that it took the automobile to travel the distance $d$, and since $d$ also is known, the duration of the timing signal of FIG. 3g may be calibrated directly in terms of velocity of the automobile.

The operation of the circuit to generate the timing signal of FIG. 3g having been described, the resetting operation of the system of FIG. 2 now will be described. The output of timing gate 36 also is coupled to a pulse multiplier 50 which function to stretch or multiply the duration of timing pulse, FIG. 3g, to a longer duration signal such as illustrated in FIG. 3p, the duration of the multiplied pulse being a multiple ($m$) of the duration of the timing pulse of FIG. 3g. In practice, pulse multiplier circuit 50 may be a gated Miller integrator circuit in which the circuit is constructed so that the discharging path of the feedback capacitor has a considerably longer time constant than that of the charging path. One circuit of this general type which has been found useful is described in copending patent application S.N. 450,652, filed Apr. 26, 1965, in the name of Harry F. Strenglein, and assigned to applicant's assignee.

The output of pulse multiplier 50, FIG. 3p, is coupled to a reset AND gate 52. The other inputs to reset gate 52 are the respective outputs from No. 1 AND gate 23, No. 2 flip-flop 42, and P.R.F. generator 14. Reset gate 52 will pass a P.R.F. pulse over line 55 to reset the two bistable flip-flops 30 and 42, and also the diode switch 17, only when the following conditions exist: There is no signal coming from No. 1 AND gate 23 (which means that the automobile of FIG. 1 has passed completely through the downstream antenna beam 12); No. 2 flip-flop 42 is in its second stable state (which means that the timing signal FIG. 3g has ended); and the multiplied pulse, FIG. 3p, from pulse multiplier 50 has terminated. The duration of the multiplied pulse from pulse multiplier 50 is chosen to have a duration that will allow ordinary vehicles that are expected to be on the roadway to be accurately monitored. If the vehicle is longer than the maximum anticipated time interval, signals still will be passing through No. 1 AND gate 23 and these signals will prevent reset gate 52 from resetting until the vehicle has passed the downstream antenna beam 12. By preventing reset gate 52 from resetting until the conclusion of the multiplied pulse from pulse multiplier 52 the system cannot inadvertently reset and begin a new timing sequence should a "dead spot" occur in the reflectivity characteristics of a vehicle. Very often the front windshield, the back window, and at high frequencies the canvas top of convertible automobiles will create such "dead spots."

A further feature is included in the system of FIG. 2 which enhances its usefulness in electronic traffic control systems. The output of pulse multiplier 50 is coupled over line 60 to P.R.F. generator 14 and this signal may be coupled to the pulse generator circuit in such a manner as to change the repetition frequency of P.R.F. generator 14 during the occurrence of the multiplied timing pulse. The output of P.R.F. generator 14 may then be passed through a filter 62 which converts the P.R.F. signal to a sine wave which is coupled to output terminal 63. This sine wave which changes frequency each time a vehicle is detected by the system may be utilized as an information signal in a frequency shift keying (FSK) information handling system. The multiplied duration of this signal also may be more compatible with other digital circuitry which will not properly handle or respond to the shorter duration timing pulse of FIG. 3g.

It will be understood that not only will the FSK signal at output terminal 63 be indicative that the system has detected a vehicle, but the very presence of the timing pulse of FIG. 3g also provides such an indication. Therefore, counting apparatus may be coupled to either output terminals 46 or 63 to provide a numerical count of the volume of traffic in the roadway that is covered by the antenna beams 11 and 12. The shapes of these beams 11 and 12 may be chosen to cover one or a plurality of adjacent lanes of traffic.

The above-mentioned self-test feature associated with the delay and disable gate 31 now will be explained, reference being made to FIG. 4 which is a simplified illustration of that circuit. The resistor $r_1$ and capacitor $c$ comprise a simple integrating network that produces the delay function of the circuit to delay the leading edge of the signal of FIG. 3e from No. 1 flip-flop 30. Under normal operation, the signal that is coupled to base 70 of transistor $T_1$ is the pulse that is passed by No. 1 AND gate 23 when a pulse is received in response to the automobile first intercepting the upstream antenna beam 11 of FIG. 1. This signal from AND gate 23 will cause transistor $T_1$ to conduct and because the collector 71 is coupled through resistor $r_2$ to capacitor $c$, the capacitor will tend to discharge through transistor $T_1$ to ground. Normally, the diode switch 17 then will be switched to disconnect the upstream receiving antenna $R_1$ and connect the downstream antenna $R_2$ and for a brief time interval no further pulses will be coupled to base 70. This will allow the charge to build up on capacitor $c_1$ and cause transistor $T_2$ to conduct to produce the waveform of FIG. 3f. If, on the other hand, the R.F. oscillator 15 or video amplifier 22 should fail, P.R.F. pulses would pass AND gate 23 and would continuously appear at base 70 of transistor $T_1$ causing it to conduct on the occurrence of each pulse. This would cause repeated discharging of capacitor $c$ and would prevent the signal of FIG. 3e from ever building up to full height and thus would permanently disable the No. 2 AND gate from passing a signal to actuate No. 2 flip-flop 42, thereby preventing the timing gate 36 from terminating its timing pulse. The traffic control equipment that utilizes the timing pulse, FIG. 3g, will interpret this as a malfunction and will initiate an appropriate response.

It will be apparent to those skilled in the art that the velocity measuring and vehicle counting portion of the system of FIG. 2 is not restricted to use with pulse type signals being radiated from transmitting antenna T, but the system also may be utilized with continuous wave signals (C.W.) and with frequency modulated (F.M.) signals when a proper F.M. detector is employed in detector circuit 19. It also will be understood by those skilled in the art that the waveforms of FIG. 3 are not drawn to exact scale but are simplified illustrations to represent the sequence of operation of the system of FIG. 2. Furthermore, other arrangements of transmitting and receiving antennas may be employed if desired. For example, separate transmitting and receiving antennas may be placed at both the beginning and the end of the known distance $d$.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. Means for determining the time of transit of a vehicle over a known distance along a predetermined path comprising the combination, means for radiating energy onto regions of said path that define the beginning and the end of said known distance, first and second receiving means for receiving reflected energy from said vehicle when it is at the beginning and end, respectively, of said known distance, detector means selectively coupled to said receiving means for producing signals only in response to the reflected energy received from said vehicle, switching means for selectively coupling said detector means to said first receiving means and being operable in response to an actuating signal to selectively couple the detector means to said second receiving means, a bistable element coupled to said detector means for producing an actuating signal in response to a first detector signal that is produced in response to energy reflected by the vehicle when at the beginning of said known distance, means for coupling said actuating signal to said switching means, timing means responsive to said actuating signal to commence a timing signal, and means coupled to said detector means for producing a terminating signal when said second receiving means receives reflected energy from the vehicle at the end of the known distance, said timing means being adapted to receive said terminating signal and operating to terminate said timing signal in response thereto.

2. The combination claimed in claim 1 and further including, signal multiplier means responsive to said timing signal for producing a multiplied signal having a duration ($m$) times longer that said timing signal, $m$ being any multiple, reset means coupled to said signal multiplier and to said detector means and operable to produce a reset signal when no signal is received from either the signal multiplier or the detector means, means for coupling said reset signal to said bistable element to reset said element and to cause said switching means to selectively reconnect the detector means to said first receiving means.

3. The combination claimed in claim 2 and further including, an AND gate coupled to receive said actuating signal and said detector signals, means for delaying the application of said actuating signal to said AND gate for a time longer than the duration of a detector signal, a second bistable element responsive to the output of said AND gate for producing said terminating signal, said second bistable element being reset by said reset signal and said terminating signal being coupled as an enabling signal to said reset means.

4. The combination claimed in claim 2 and further including,
a variable repetition rate pulse generator for producing a series of pulses,
means for coupling said multiplied signal to said pulse generator,
said pulse generator responding to said multiplied signal to change its repetition rate during the occurrence of the multiplied signal.

5. The combination claimed in claim 4 and further including,
a source of energy coupled to said pulse generator for producing pulses of said energy that is radiated onto the regions of said path that define the beginning and end of the known distance,
means including gating means coupled to said source of energy, to said detector means, and to said pulse generator and operable to pass a continuous series of pulses from said pulse generator in the absence of said energy pulses.

6. The combination claimed in claim 5 and further including,
disabling means coupled to said gating means and to said first bistable element and operable in response only to a continuous series of pulses from the gating means to prevent the application of said actuating signal to said AND gate.

7. Apparatus for determining the velocity of a vehicle traveling a known distance along a predetermined path, said apparatus comprising,
means for producing a first distance signal when said vehicle commences traveling said known distance,
means for producing a second distance signal when said vehicle reaches the end of said known distance,
said last-named means being initially disabled,
a first bistable means for producing an actuating signal in response to said first distance signal,
means responsive to said actuating signal for disabling the means for producing said first distance signal and for enabling the means for producing said second distance signal,
timing means for commencing a timing signal in response to said actuating signal,
gating means coupled to receive said actuating signal and said distance signals for producing a gating signal when said actuating signal is coincident in time with one of said distance signals,
means for delaying the actuating signal to prevent coincidence with said first distance signal at said gating means, whereby said gating signal is produced by said second distance signal and said actuating signal,
a second bistable means for transferring to its second stable state to produce a terminating signal in response to said gating signal, and
means for coupling said terminating signal to said timing means to terminate said timing signal.

8. The combination claimed in claim 7 and further including,
pulse multiplier means responsive to said timing signal for producing a multiplied signal whose duration is longer than said timing signal by a multiple ($m$),
resetting means coupled to receive said multiplied signal, said terminating signal, and the output signal from the means for producing said second distance signal and operating in response thereto to reset said two bistable means only when the second bistable means is in its second stable state and after the multiplied signal and the output signal from the means for producing the second distance signal have terminated.

9. Apparatus for determining the velocity of a vehicle traveling a known distance along a predetermined path, said apparatus comprising
means for producing a first distance signal when said vehicle commences traveling said known distance,
means for producing a second distance signal when said vehicle reaches the end of said known distance,
bistable means responsive to said first distance signal for producing an actuating signal,
means responsive to said actuating signal for disabling the means for producing the first distance signal and for enabling said means for producing a second distance signal,
timing means for commencing a timing signal in response to said actuating signal,
means for producing a terminating signal in response to said second distance signal,
said timing means responding to said terminating signal to end said timing signal,
pulse multiplier means for producing a multiplied signal whose duration is longer than said timing signal by a multiple $m$, and
reset means for resetting said bistable means and for enabling the means for producing the first distance signal and for disabling the means for producing the second distance signal only after the conclusion of the multiplied signal and after the conclusion of said second distance signal.

10. Means for determining the time of transit of a vehicle over a known distance comprising the combination,
pulse generating means for producing a succession of pulses,
a source of energy responsive to said pulses for producing energy pulses to be radiated,
means for radiating said pulses of energy onto regions that define the beginning and the end of said known distance,
first and second antenna means for receiving pulses of energy that are reflected by said vehicle when it is at the beginning and end, respectively, of said known distance,
detector means for producing pulses only in response to pulses of energy reflected from said vehicle,
switching means for selectively coupling said antenna means to said detector means,
said switching means being initially set to couple said first antenna means to said detector means,
a first bistable element for producing an actuating signal in response to a detector pulse corresponding to a pulse of energy reflected from said vehicle when it reaches the beginning of said known distance,
said switching means being coupled to receive said actuating signal and responding thereto to interchange the connection of said detector means from said first to said second antenna means,
a timing gate for initiating a timing signal at the commencement of said actuating signal,
delay means also coupled to said first bistable element for delaying said actuating signal by a time interval greater than the duration of a detector pulse,
an AND gate coupled to receive said delayed actuating signal and the output of said detector means and operable to produce an output pulse only upon coincidence of the two inputs thereto,
a second bistable element coupled to said AND gate and operable to produce a terminating signal in response to the coincidence in said AND gate of said actuating signal and a detector pulse corresponding to a reflected energy pulse that is received when said vehicle reaches the end of said known distance,
said timing gate being coupled to said second bistable element and responding to said terminating signal to terminate said timing signal,
pulse multiplier means coupled to said timing gate for producing a multiplied signal whose duration is ($m$) times longer than the timing signal, and
reset means responsive to said multiplied signal, to said terminating signal, and to the output of said detector means, and operable to produce a reset signal only in the presence of said terminating signal and in the absence of said multiplied signal and in the absence of output pulses from said detector means, said two bistable elements being operable in response to said reset signal to reset to their initial conditions.

References Cited by the Examiner

UNITED STATES PATENTS

| | | | |
|---|---|---|---|
| 2,817,833 | 12/1957 | Hutchinson et al. | 343—13 |
| 3,143,734 | 8/1964 | Raabe | 343—9 |

CHESTER L. JUSTUS, *Primary Examiner.*

RODNEY D. BENNETT, *Examiner.*